(12) United States Patent
Scully et al.

(10) Patent No.: US 10,410,203 B1
(45) Date of Patent: Sep. 10, 2019

(54) UNIVERSAL CHECK DEPOSIT SYSTEMS AND METHODS

(71) Applicant: Bank of America Corporation, Charlotte, NC (US)

(72) Inventors: John E. Scully, Wilmette, IL (US); Robert S. Mumma, Chicago, IL (US); Patrick E. Burgess, Jr., Chicago, IL (US)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 16/053,979

(22) Filed: Aug. 3, 2018

(51) Int. Cl.
| G06Q 40/00 | (2012.01) |
| G07D 11/00 | (2019.01) |
| G07F 19/00 | (2006.01) |
| G06Q 20/32 | (2012.01) |
| G06Q 40/02 | (2012.01) |
| G06Q 20/04 | (2012.01) |
| G06Q 20/36 | (2012.01) |
| G06Q 20/10 | (2012.01) |

(52) U.S. Cl.
CPC ....... *G06Q 20/3223* (2013.01); *G06Q 20/042* (2013.01); *G06Q 20/108* (2013.01); *G06Q 20/3221* (2013.01); *G06Q 20/363* (2013.01); *G06Q 40/02* (2013.01)

(58) Field of Classification Search
USPC ........................................................ 235/379
See application file for complete search history.

(56) References Cited

U.S. PATENT DOCUMENTS

| 8,275,715 | B2 | 9/2012 | Caruso et al. |
| 8,639,016 | B2 | 1/2014 | Frew |
| 8,688,579 | B1 | 4/2014 | Ethington et al. |
| 8,811,711 | B2 | 8/2014 | Calman et al. |
| 8,983,170 | B2 | 3/2015 | Nepomniachtchi et al. |
| 9,195,974 | B2 | 11/2015 | Narendra et al. |
| 9,230,282 | B2 | 1/2016 | Narendra et al. |
| 9,959,533 | B2 | 5/2018 | Narendra et al. |
| 10,178,246 | B1* | 1/2019 | Horvath ............. H04N 1/00129 |
| 2012/0197797 | A1* | 8/2012 | Grigg ................. G06Q 20/1085 705/43 |
| 2014/0236791 | A1* | 8/2014 | Palmer .................. G06Q 40/02 705/35 |
| 2014/0279310 | A1 | 9/2014 | Fossella et al. |
| 2014/0355865 | A1* | 12/2014 | Cantley ............... G06Q 20/042 382/137 |

(Continued)

*Primary Examiner* — Tuyen K Vo
(74) *Attorney, Agent, or Firm* — Weiss & Arons LLP; Michael A. Springs, Esq.

(57) ABSTRACT

Apparatus and methods for supporting a mobile check deposit of a check into a bank account, the check having a first value, the first value being in a first currency, the bank account holding funds having a second currency. The system architecture may include one or more of a mobile phone platform, a shadow account creator module, a mobile check deposit host and/or a shadow account module. The mobile phone platform may provide a user with a selectable display including a plurality of bank accounts in which the check may be deposited, the plurality of bank accounts including the bank account. The shadow account creator may store funds having the first value or a second value, in the second currency, until the check has been cleared by a clearinghouse and/or honored by a drawing bank.

20 Claims, 3 Drawing Sheets

(56) References Cited

U.S. PATENT DOCUMENTS

| | | | |
|---|---|---|---|
| 2015/0371326 A1* | 12/2015 | Montesano | G06Q 40/025 705/38 |
| 2017/0061531 A1* | 3/2017 | Smith | G06Q 40/02 |
| 2017/0278080 A1 | 9/2017 | Kruszka et al. | |

* cited by examiner

UNIVERSAL CHECK DEPOSIT SYSTEMS AND METHODS

FIELD OF TECHNOLOGY

Aspects of the disclosure relate to providing apparatus and methods for depositing checks. In particular, the disclosure relates to apparatus and methods for depositing a check having a value in a first currency into a bank account holding funds having a value in a second currency.

BACKGROUND

Mobile check deposit has rapidly become a popular method for depositing checks. Mobile check deposit allows a customer to deposit his checks at any place and time, and saves the customer a time-consuming visit to a brick and mortar bank. Mobile check deposit also helps banks process checks in an efficient and timely fashion.

In today's globalized economy, it is becoming increasingly common for individuals to obtain checks drawn on different international banks. Additionally, many financial institutions allow a user to have a first bank account holding funds in a first currency and a second bank account holding funds in a second currency. For example, some banks support both U.S. dollar bank accounts and Canadian dollar bank accounts.

Conventional mobile check deposit systems do not offer their users the option of depositing a check having a value in a first currency into a bank account holding funds having a value in a second currency. It would be desirable, therefore, to provide apparatus and methods for allowing a customer to use a mobile check deposit system to deposit a check having a value in a first currency into a bank account holding funds having a second currency.

SUMMARY OF THE DISCLOSURE

Systems and methods are provided for supporting the mobile check deposit of a check into a bank account. The check may have a first value. The first value may be in a first currency. The bank account may store funds having a second currency.

The system architecture may include a mobile phone platform. The mobile phone platform may capture an image of the check. The mobile phone platform may provide to the user a selectable display. The selectable display may include a plurality of bank accounts in which the check may be deposited. The plurality of bank accounts may include the bank account.

The mobile phone platform may receive a selection of the bank account from the user. The mobile phone platform may create a time stamp identifying a time that the selection was received.

In response to the receiving, the mobile phone platform may transmit a request to a shadow account creator module to generate a shadow account.

The system architecture may include the shadow account creator module. The shadow account creator module may generate the shadow account and a shadow account identification number. The shadow account creator may append the shadow account to the bank account. The shadow account creator may transmit the shadow account identification number to the mobile phone platform.

The mobile phone platform may transmit a notification to a mobile check deposit host. The notification may include the first value, the first currency, the second currency the time stamp and the shadow account identification number.

The mobile check deposit host may identify an exchange rate between the first and second currency at a time corresponding to the time stamp. The mobile check deposit host may accumulate funds having a second value in the second currency. The second value may be the first value, in the first currency, converted to the second currency using the exchange rate.

The mobile check deposit host may transfer the funds to the shadow account. The mobile check deposit host may transmit a first notification to the user that the funds are in the shadow account.

The shadow account may hold the funds. The funds, in the shadow account, may be inaccessible to the user.

The mobile phone platform may transmit the image to a clearinghouse.

The shadow account may, upon receipt of an instruction from the mobile check deposit host, transfer the funds into the bank account and closing the shadow account.

The mobile check deposit host may transmit a second notification to the user that the funds have been deposited in the bank account.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
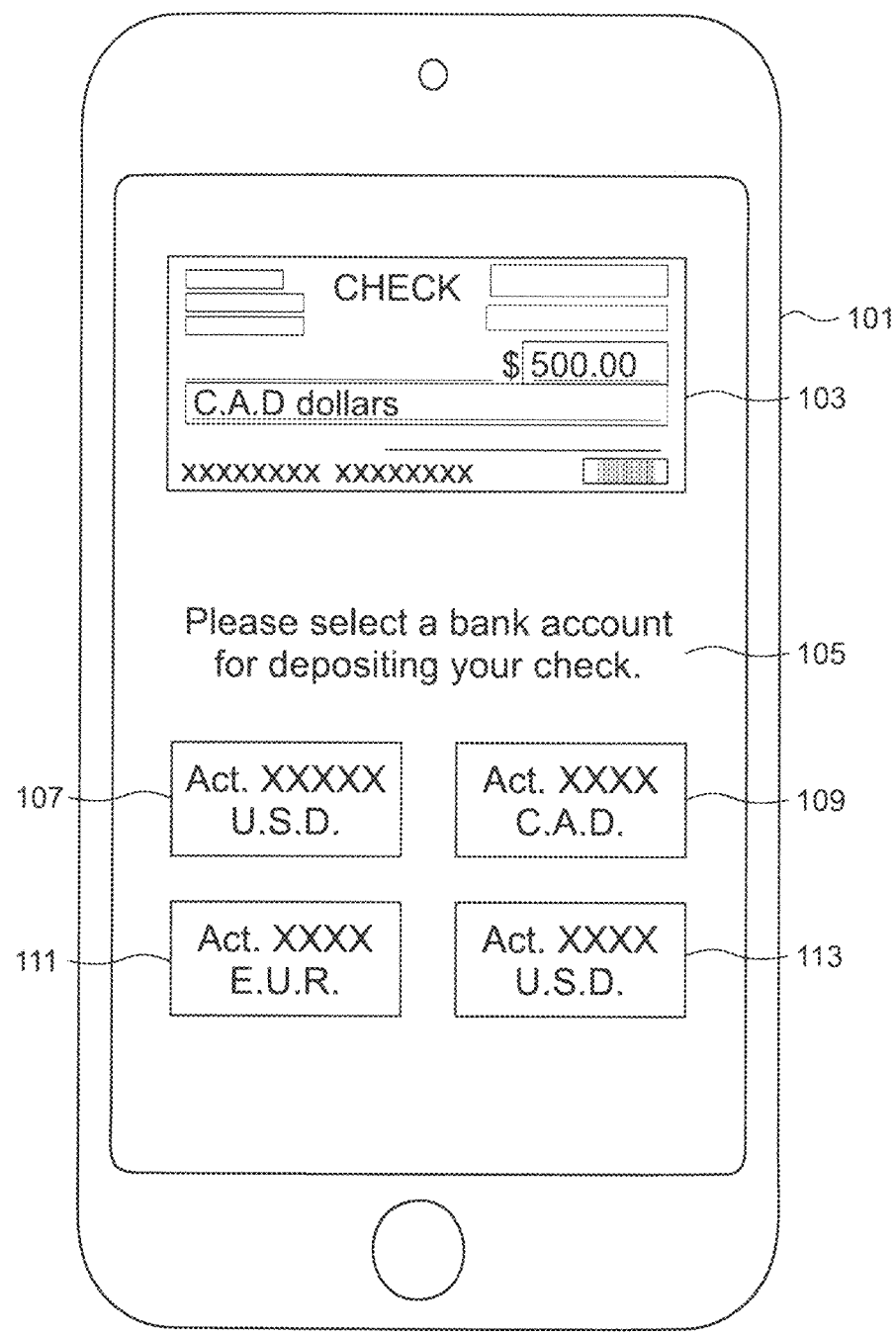
FIG. 1 shows an illustrative graphical user interface in accordance with the invention.

Apparatus and methods for supporting a mobile check deposit of a check into a bank account are provided. The apparatus and methods may be implemented on any suitable hardware device, such as a mobile phone, tablet, personal computer, or any other suitable hardware or software devices that supports a connection to one or more communication networks.

Systems and methods described herein use a mobile phone application to capture an image of a check. A customer may, instead, deposit the check at a brick and mortar banking center, and functions performed by the mobile phone platform may be performed at least in part by a check deposit platform located in the brick and mortar banking center.

Systems and methods are provided for supporting a mobile check deposit of a check into a bank account. The check may have a first value. The first value may be in a first currency. The bank account may store funds having a second currency.

In some embodiments the check may be in Canadian dollars and the bank account may store American Dollars. In some embodiments the check may be American dollars and the bank account may store Canadian dollars. The first currency and the second currency may each be any other suitable currency.

The system architecture may include a mobile phone platform. The mobile phone platform may capture an image of the check. The mobile phone platform may provide to the user a selectable display. The selectable display may include a plurality of bank accounts in which the check may be deposited. The plurality of bank accounts may include the bank account.

The plurality of bank accounts may each store a different currency. Two or more of the plurality of banks accounts may store funds having the same currency. The bank account may be a first bank account and the plurality of bank accounts may include a second bank account holding funds in the first currency and a third bank account holding funds in a third currency.

The mobile phone platform may receive a selection of the bank account from the user. The mobile phone platform may create a time stamp identifying a time that the selection was received.

In response to the receiving, the mobile phone platform may transmit a request to a shadow account creator module to generate a shadow account.

The system architecture may include the shadow account creator module. The shadow account creator module may generate the shadow account and a shadow account identification number. The shadow account creator may append the shadow account to the bank account. The shadow account creator may transmit the shadow account identification number to the mobile phone platform.

The mobile phone platform may transmit a notification to a mobile check deposit host. The notification may include the first value, the first currency, the second currency the time stamp and the shadow account identification number.

The mobile check deposit host may identify an exchange rate between the first and second currency at a time corresponding to the time stamp. The mobile check deposit host may identify the exchange rate by accessing an international exchange rate platform and finding the exchange rate at the time of the time stamp. The identifying the exchange rate includes may include querying a foreign exchange rate platform.

The mobile check deposit host may accumulate funds having a second value in the second currency. The second value may be the first value, in the first currency, converted to the second currency using the exchange rate. The mobile check deposit host may accumulate the funds using a currency exchange platform. The currency exchange platform may offer the mobile check deposit host the option of trading funds having a first value in a first currency for funds having a second value in a second currency.

The mobile check deposit host may accumulate the funds by trading funds having a third value in a third currency to acquire the funds having the second value in the second currency.

The mobile check deposit host may transfer the funds to the shadow account. The mobile check deposit host may transmit a first notification to the user that the funds are in the shadow account.

The shadow account may hold the funds. The funds, in the shadow account, may be inaccessible to the user. The funds held by the shadow account may be the funds accumulated by the mobile check deposit host less fees, such as processing fees, exchange rate fees, or any other suitable fees. The fees may be charged by the mobile check deposit host and/or a financial institution associated with the bank account.

The system architecture may include an online banking portal. After the shadow account has been appended to the bank account, the online banking portal may display the shadow account and any funds that are being held by the shadow account. The online banking portal may display shadow account information in a view-only format.

The user's bank account balance may or may not include a balance of funds being held in the shadow account. One or more alerts may be displayed on, or adjacent to, an online baking portal's graphical user interface displaying the shadow account, the alerts indicating that the balance in the shadow account is inaccessible to the user and has not yet been cleared by a clearinghouse and/or honored by a drawing bank.

The mobile phone platform may display to the user a balance of the funds in the shadow account. The mobile phone platform may include one or more alerts indicating that the balance in the shadow account is inaccessible to the user and has not yet been cleared by a clearinghouse and/or honored by a drawing bank.

The mobile phone platform may transmit the image to a clearinghouse.

The clearinghouse may be a clearinghouse that clears funds having the first currency. The clearinghouse may be a clearinghouse that clears funds drawn on a bank that the check is drawn on.

The clearinghouse may be supported by a first country and the mobile check deposit host may be supported by a company located in a second country.

The mobile check deposit host may access historical data of checks deposited in the second account and, based on the historical data, determining a period of time for holding the funds in the shadow account after the check has cleared the clearinghouse.

The mobile check deposit host may query a database storing regulations for funds having the second currency and, based on retrieved regulations, determining a period of time for holding the funds in the shadow account after the check has cleared the clearinghouse.

The mobile check deposit host may transmit an instruction to the shadow account to transfer the funds to the bank account after the check has cleared the clearinghouse. The mobile check deposit host may transmit the instruction to transfer the funds after funds having the first value in the first currency have been transferred from an account on which the check was drawn.

The shadow account may, upon receipt of an instruction from the mobile check deposit host, transfer the funds into the bank account. After the funds have been transferred into the bank account the shadow account may be closed. The mobile check deposit host may delete the shadow account after the funds are transferred out of the shadow account and into the bank account. Any display on the user's online banking portal pertaining to the shadow account may be removed.

After the successful transfer of the funds from the shadow account into the bank account, the mobile check deposit host may transmit a second notification to the user that the funds have been deposited in the bank account and are now accessible to the user.

In the event that the check fails to clear the clearinghouse, and/or the check is not honored by a bank on which the check was drawn, the mobile check deposit host may withdraw the funds from the shadow account. After the funds have been transferred out of the shadow account, the shadow account may close. The mobile check deposit host may transmit a notification to the user that the funds in the shadow account have been withdrawn. The notification may include a reason code stating the reason why the funds have been withdrawn.

Systems and methods are provided for supporting a mobile check deposit of a check into a bank account. The check may have a first value. The first value may be in a first currency. The bank account may store funds having a second currency.

The system architecture may include the mobile phone platform for capturing an image of the check, providing to the user the selectable display including the plurality of bank accounts in which the check may be deposited, the plurality of bank accounts including the bank account, and receiving the selection of the bank account from the user and creating a time stamp identifying a time that the selection was received.

In response to the receiving of the selection, the mobile phone platform may transmit the image to the mobile check deposit host.

The mobile check deposit host may transmit the image to the clearinghouse. The mobile check deposit host may identify an exchange rate between the first and second currency at a time corresponding to the time stamp. The mobile check deposit host may accumulate funds having a second value in the second currency, the second value being the first value, in the first currency, converted to the second currency using the exchange rate.

The mobile check deposit host may generate the shadow account associated with the bank account. The mobile check deposit host may transfer the accumulated funds into the shadow account, the funds being inaccessible to the user.

The system architecture may include the shadow account for, upon receipt of an instruction from the mobile check deposit host, transferring the funds into the bank account and closing the shadow account.

Systems and methods are provided for supporting a mobile check deposit of a check into a bank account. The check may have a first value. The first value may be in a first currency. The bank account may store funds having a second currency.

The system architecture may include the mobile phone platform for capturing an image of the check, providing to the user the selectable display including the plurality of bank accounts in which the check may be deposited, the plurality of bank accounts including the bank account, and receiving the selection of the bank account from the user.

In response to the receiving, the mobile phone platform may transmit a request to the shadow account creator module to generate the shadow account.

The system architecture may include the shadow account creator module. The shadow account creator module may generate the shadow account and a shadow account identification number. The shadow account creator may append the shadow account to the bank account. The shadow account creator may transmit the shadow account identification number to the mobile check deposit host.

The mobile check deposit host may transmit the image to a clearinghouse. The mobile check deposit host may receive the first value of the first funds directly or indirectly from an account upon which the check was drawn upon. The mobile check deposit host may deposit the first value of the first funds into the shadow account. The mobile check deposit host may deposit the first value of the first funds less fees, such as processing fees, exchange rate fees, or any other suitable fees. The fees may be charged by the mobile check deposit host and/or a financial institution associated with the bank account.

The system architecture may include a shadow account module for identifying an exchange rate between the first and second currency. The exchange rate may be calculated at a time of the deposit of the first value of the first funds in the shadow account.

The shadow account module may accumulate funds having a second value in the second currency, the second value being the first value, in the first currency, converted to the second currency using the exchange rate. The shadow account module may trade the funds deposited in the shadow account for funds having a value in the second currency.

The shadow account module may trade the funds using a currency exchange platform. The currency exchange platform may offer the shadow account module the option of trading the deposited funds having the first value in the first currency for funds having a second value in a second currency.

After the shadow account module has executed the currency exchange, and funds having the second value in the second currency have been deposited into the shadow account, the shadow account module may transfer the funds from the shadow account and into the account. After the depositing of the funds, the shadow account module may close the shadow account.

One or more functions performed by the mobile phone platform, the shadow account creator module, the mobile check deposit host, the shadow account and/or the shadow account module may be performed by a different one of the mobile phone platform, the shadow account creator module, the mobile check deposit host, the shadow account and/or the shadow account module.

Functions performed by two or more of the mobile phone platform, the shadow account creator module, the mobile check deposit host, the shadow account and/or the shadow account module may be performed by one of the mobile phone platform, the shadow account creator module, the mobile check deposit host, the shadow account and/or the shadow account module.

Each of the mobile phone platform, the shadow account creator module, the mobile check deposit host, the shadow account and/or the shadow account module may be implemented on computer hardware and may use one or more of a transmitter, receiver, processor, database, or any other suitable hardware to perform the functions described herein.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows mobile phone 101. Mobile phone 101 may run the mobile phone platform. Mobile phone 101 includes a graphical user interface displaying an image of check 103 captured by the mobile phone platform.

Mobile phone 101 includes a display of the plurality of bank accounts. The plurality of bank accounts includes U.S. dollar account 107, Canadian dollar account 109, Euro dollar account 111 and U.S. dollar account 113.

The graphical user interface on mobile phone 101 includes prompt 105. Prompt 105 requests a user to select a bank account from the displayed bank accounts in which to deposit check 103.

Figure 2:
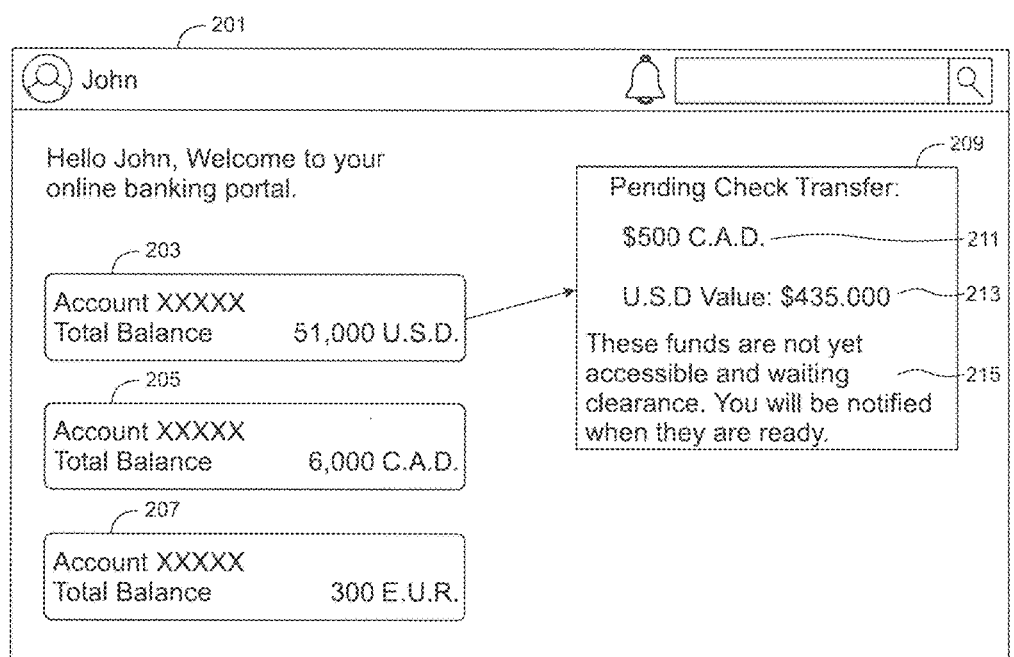
FIG. 2 shows another illustrative graphical user interface in accordance with the invention.

FIG. 2 shows illustrative online baking portal 201. Online banking portal 201 displays account balances of Account 203, Account 205 and Account 207.

Online baking portal 201 also includes a display of shadow account 209. Shadow account 209 has been appended to Account 203. The display of information relating to shadow account 209 includes the element 211, showing a value of the check being deposited, element 213, showing a value of the check after being converted into the currency of Account 203, and alert 215.

Alert 215 includes a notification notifying the user of online banking portal 201 that the funds in the shadow account are not yet accessible and are still awaiting clearance by the clearinghouse.

Figure 3:
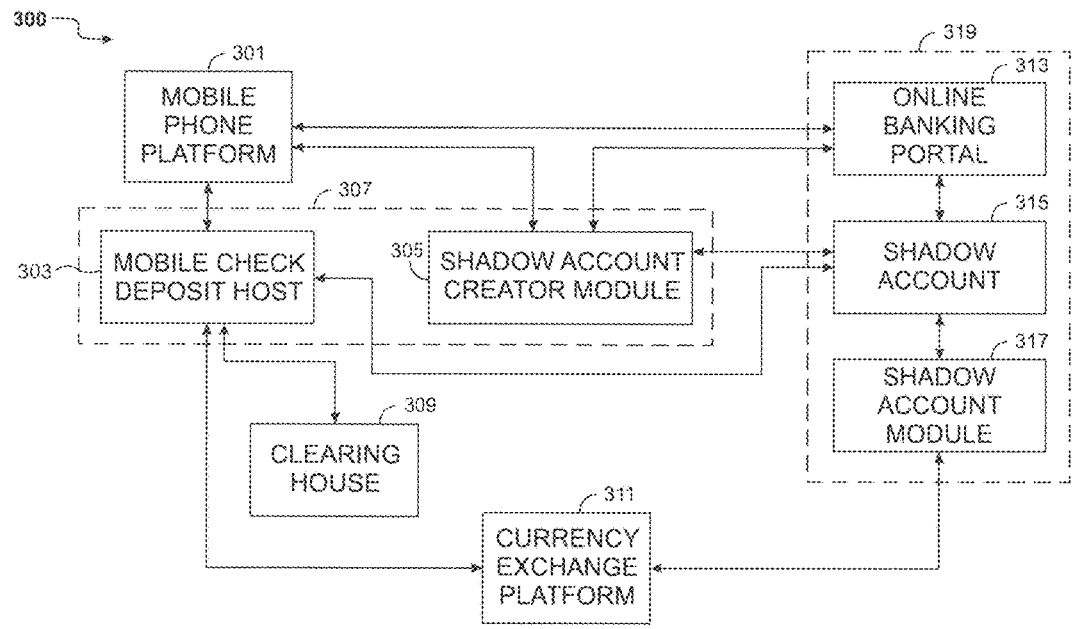
FIG. 3 shows an illustrative system in accordance with the invention.

FIG. 3 shows illustrative system architecture 300. System architecture 300 shows exemplary components that may form a system architecture described herein. System architecture 300 also shows exemplary communication between the exemplary components that may be utilized to perform the systems and methods of the invention.

System architecture 300 may include mobile phone platform 301. Mobile phone platform 301 may be in electronic communication with online banking portal 313 and mobile check deposit host 313. Mobile phone platform 301 may also be in electronic communication with shadow account creator module 305.

System architecture 300 shows optional merging 307 of functions performed by mobile check deposit host 303 and shadow account creator 305.

System architecture 300 may include clearing house 309 and currency exchange platform 311. Clearing house 309 may be in communication with mobile check deposit host 303. Currency exchange platform may be in communication with optional shadow account module 317 and/or mobile check deposit host 313.

System architecture 300 may include online banking portal 313, shadow account 315 and optional shadow account module 317. System architecture 300 shows optional merging 319 of functions performed by online banking portal 313, shadow account 315 and shadow account module 317.

Communication paths illustrated in FIG. 3 are illustrative. System architectures described herein may include additional, or fewer, communication paths than those illustrated in FIG. 3.

Components of system architecture 300 may each include one or more computers, processors configured for controlling operation of associated components, receivers, transmitters, memory, application(s) and/or data.

System architecture 300 may operate in a networked environment supporting connections to the illustrated components. Illustrated components may each be personal computer(s) and/or server(s). The connections between the components may be supported by one or more local area networks (LAN), wide area networks (WAN) 329 such as the internet, and any other suitable networks.

Thus, systems and methods for mobile check deposit system have been provided. Persons skilled in the art will appreciate that the present invention can be practiced by other than the described embodiments, which are presented for purposes of illustration rather than of limitation.

What is claimed is:

1. A system architecture for supporting a mobile check deposit of a check into a bank account, the check having a first value, the first value being in a first currency, the bank account holding funds having a second currency, the system architecture comprising:
a mobile phone platform for:
capturing an image of the check;
providing to a user a selectable display including a plurality of bank accounts in which the check may be deposited, the plurality of bank accounts including the bank account;
receiving a selection of the bank account from the user and creating a time stamp identifying a time that the selection was received; and
in response to the receiving, transmitting a request to a shadow account creator module to generate a shadow account;
the shadow account creator module for:
generating the shadow account and a shadow account identification number;
appending the shadow account to the bank account; and
transmitting the shadow account identification number to the mobile phone platform;
the mobile phone platform for transmitting a notification to a mobile check deposit host, the notification including the first value, the first currency, the second currency the time stamp and the shadow account identification number;
the mobile check deposit host for:
identifying an exchange rate between the first and second currency at a time corresponding to the time stamp;
accumulating funds having a second value in the second currency, the second value being the first value, in the first currency, converted to the second currency using the exchange rate;
transferring the funds to the shadow account; and
transmitting a first notification to the user that the funds are in the shadow account;
the shadow account for holding the funds, the funds being inaccessible to the user;
the mobile phone platform for transmitting the image to a clearinghouse;

the shadow account for, upon receipt of an instruction from the mobile check deposit host, transferring the funds into the bank account and closing the shadow account; and the mobile check deposit host for transmitting a second notification to the user that the funds have been deposited in the bank account.

2. The system architecture of claim 1 wherein the mobile check deposit host is configured to transmit the instruction to the shadow account to transfer the funds after the check has cleared the clearinghouse.

3. The system architecture of claim 1 wherein the mobile check deposit host is configured to transmit the instruction to the shadow account to transfer the funds after funds having the first value in the first currency have been transferred from an account on which the check was drawn.

4. The system architecture of claim 1 wherein the mobile check deposit host is configured to withdraw the funds from the shadow account in response to a determination that the check has not cleared the clearinghouse.

5. The system architecture of claim 1 wherein, when the bank account is a first bank account, the plurality of bank accounts includes a second bank account holding funds in the first currency and a third bank account holding funds in a third currency.

6. The system architecture of claim 1 further comprising an online banking portal configured to display to the user in a view-only format a graphical user interface including the shadow account.

7. The system architecture of claim 1 wherein the mobile check deposit host is configured to accumulate the funds by trading funds having a third value in a third currency to acquire the funds having the second value in the second currency.

8. The system architecture of claim 1 wherein the clearinghouse is supported by a first country and the mobile check deposit host is supported by a second country.

9. The system architecture of claim 1 wherein the identifying the exchange rate includes querying a foreign exchange rate platform.

10. The system architecture of claim 1 wherein the mobile check deposit host is configured to delete the shadow account after the funds are transferred out of the shadow account and into the bank account.

11. The system architecture of claim 1 wherein mobile phone platform is configured to display to the user a balance of the funds in the shadow account.

12. The system architecture of claim 1 wherein the mobile check deposit host is configured to access historical data of checks deposited in the second account and, based on the historical data, determine a period of time for holding the funds in the shadow account after the check has cleared the clearinghouse.

13. The system architecture of claim 1 wherein the mobile check deposit host is configured to query a database storing regulations for funds having the second currency and, based on retrieved regulations, determine a period of time for holding the funds in the shadow account after the check has cleared the clearinghouse.

14. The system architecture of claim 1 wherein the funds held by the shadow account are the funds accumulated by the mobile check deposit host less processing fees charged by the mobile check deposit host.

15. A system architecture for supporting a mobile check deposit of a check into a bank account, the check having a first value, the first value being in a first currency, the bank account holding funds having a second currency, the system architecture comprising:

a mobile phone platform for:
capturing an image of the check;
providing to a user a selectable display including a plurality of bank accounts in which the check may be deposited, the plurality of bank accounts including the bank account;
receiving a selection of the bank account from the user and creating a time stamp identifying a time that the selection was received; and
in response to the receiving, transmitting the image to a mobile check deposit host;

the mobile check deposit host for:
transmitting the image to a clearinghouse;
identifying an exchange rate between the first and second currency at a time corresponding to the time stamp;
accumulating funds having a second value in the second currency, the second value being the first value, in the first currency, converted to the second currency using the exchange rate;
generating a shadow account associated with the bank account; and
transferring the accumulated funds into the shadow account, the funds being inaccessible to the user; and the shadow account for, upon receipt of an instruction from the mobile check deposit host, transferring the funds into the bank account and closing the shadow account.

16. The system architecture of claim 15 wherein the mobile check deposit host is configured to accumulate the funds by trading funds having a third value in a third currency to acquire the funds having the second value in the second currency.

17. The system architecture of claim 15 wherein the mobile phone platform is configured to display to the user a balance of the funds in the shadow account.

18. The system architecture of claim 15 wherein the clearinghouse is supported by a first country and the mobile check deposit host is supported by a second country.

19. The system architecture of claim 15 wherein the mobile check deposit host is configured to withdraw the funds from the shadow account in response to a determination that the check has not cleared the clearinghouse.

20. A system architecture for supporting a mobile check deposit of a check into a bank account, the check having a first value, the first value being in a first currency, the bank account holding funds having a second currency, the system architecture comprising:

a mobile phone platform for:
capturing an image of the check;
providing to a user a selectable display including a plurality of bank accounts in which the check may be deposited, the plurality of bank accounts including the bank account;
receiving a selection of the bank account from the user; and
in response to the receiving, transmitting a request to a shadow account creator module to generate a shadow account;

the shadow account creator module for:
generating the shadow account and a shadow account identification number; and appending the shadow account to the bank account and transmitting the shadow account identification number to the mobile check deposit host;

the mobile check deposit host for:

transmitting the image to a clearinghouse;

receiving the first value of the first funds directly or indirectly from an account upon which the check was drawn upon; and depositing the first value of the first funds into the shadow account; and a shadow account module for:

identifying an exchange rate between the first and second currency, the exchange rate being calculating at a time of the deposit of the first value of the first funds in the shadow account;

trading the first value of the first funds for a second value of funds in the second currency, the second value being the first value, in the first currency, converted to the second currency using the exchange rate and less a processing fee;

depositing the funds having the second value in the second currency into the shadow account; and transferring the funds from the shadow account to the bank account.

* * * * *